Aug. 14, 1956 R. A. QUIMBY 2,758,427
INTERNAL GRINDING MACHINE
Filed May 11, 1953 2 Sheets-Sheet 1
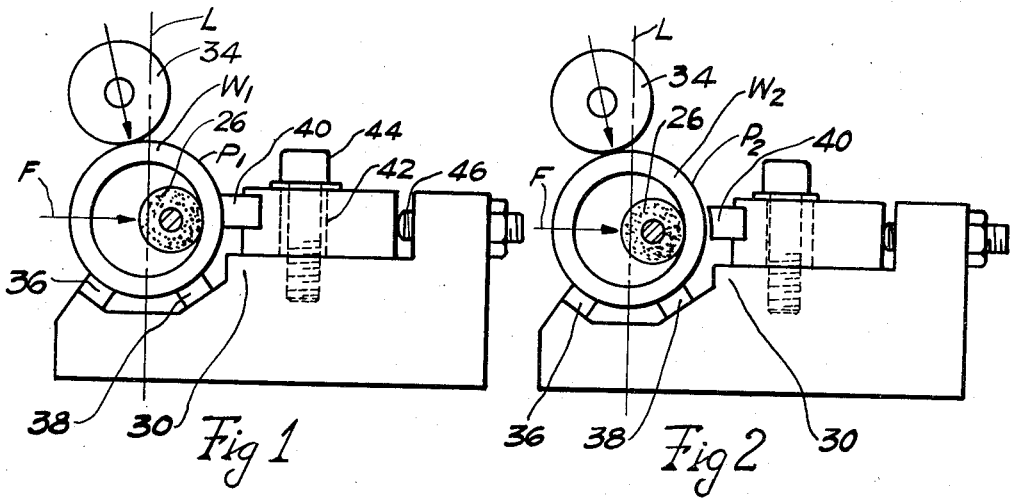
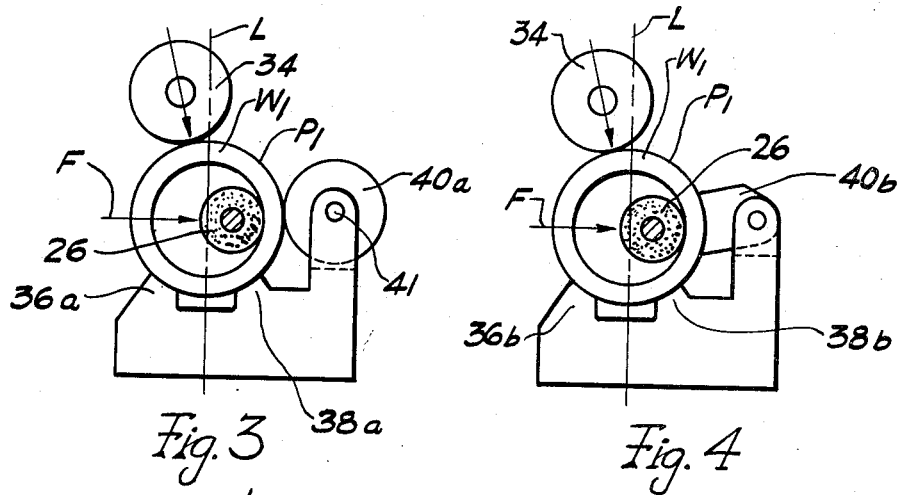
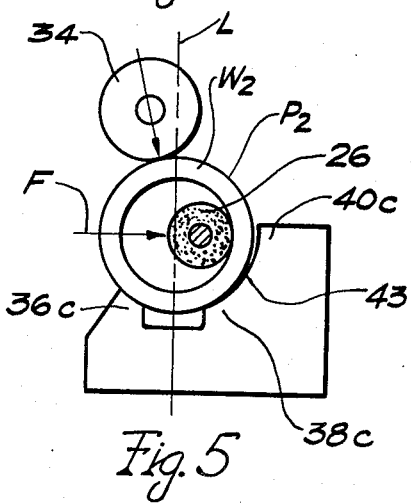
Ralph A. Quimby
INVENTOR.
BY Dike, Thompson + Sanborn
attys Aug. 14, 1956    R. A. QUIMBY    2,758,427
INTERNAL GRINDING MACHINE
Filed May 11, 1953    2 Sheets-Sheet 2
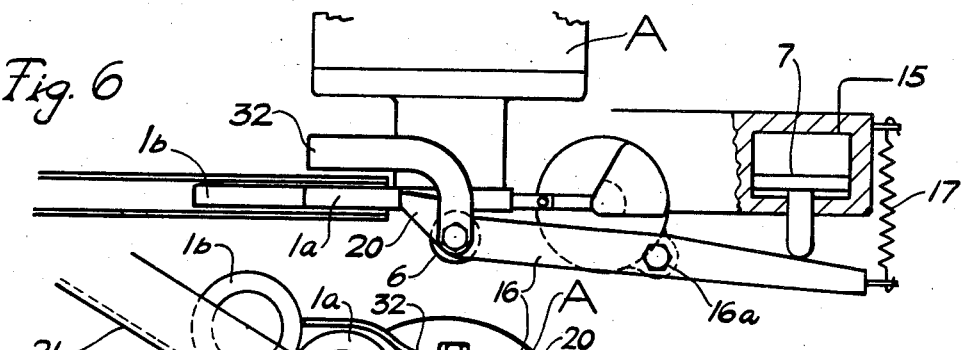
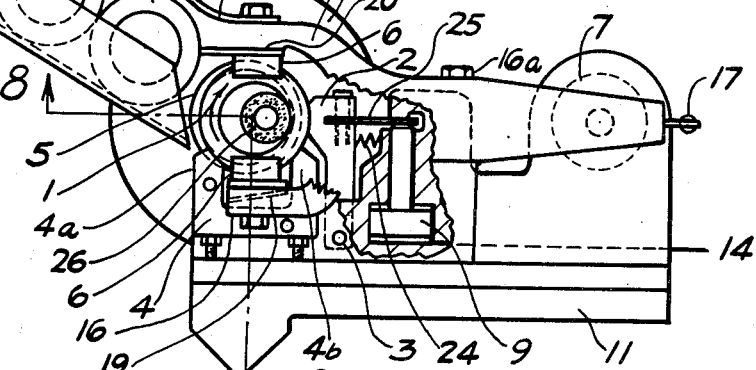
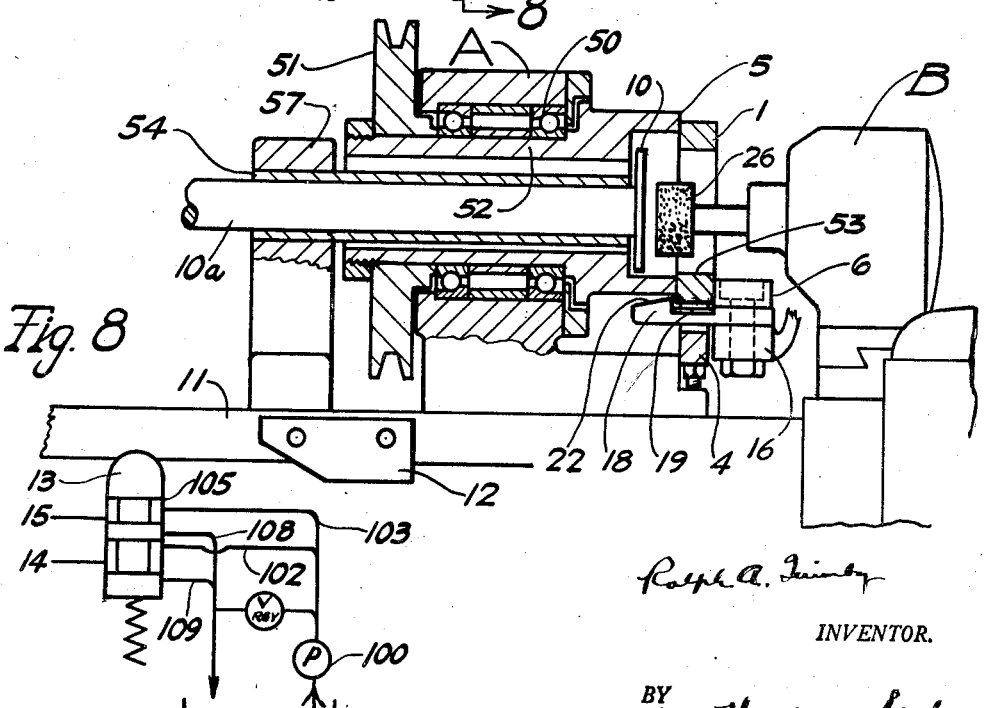
Ralph A. Quimby
INVENTOR.
BY Dike, Thompson & Sanborn
attys United States Patent Office 2,758,427
Patented Aug. 14, 1956

2,758,427

INTERNAL GRINDING MACHINE

Ralph A. Quimby, Worcester, Mass., assignor to The Heald Machine Company, Worcester, Mass., a corporation of Massachusetts Application May 11, 1953, Serial No. 354,197

8 Claims. (Cl. 51—95)

This invention relates to internal grinding machines and particularly to work sizing in which a round workpiece is rotated and supported by an outer peripheral surface while the rotating tool is being applied to an internal surface.

In refining the internal surfaces of a succession of workpieces to the same predetermined diameter within the tolerances demanded by modern industry, which may be of the order of a fraction of a thousandth of an inch, the problem of precisely locating the successive workpieces with respect to the cutting tool has always presented difficulties. The workpiece must be supported by its outer peripheral surface. If all workpieces of a succession had exactly the same outer diameter, it would be fairly simple to index each workpiece of a succession with its center at exactly the same spot. But the normal economical machining of a workpiece which precedes the refinement of its internal surface, results in slight variations in the outside diameters of successive workpieces. This makes it difficult to index each workpiece in the support so that finished inside diameters can be held precisely consistent and at the same time provide adequate support for the workpiece to oppose the force applied by the wheel against the work, particularly during heavy roughing cuts taken by the tool prior to the lighter finishing cuts.

One prior method of supporting each of a succession of workpieces has been to provide fixed supports at two points on the outer periphery of the workpiece which are symmetrical to a line at right angles to the line of force applied by the tool against the work. The centers of successive workpieces of slightly varying outer diameter will lie along the line at right angles to the movement of the tool into the work. Variations in workpiece size will therefore be tangential to the grinding tool at its final position and will therefore be inconsequential in the direction of feed of the wheel into the work. For practical purposes the final position of the wheel will then bear a consistent relationship with the centers of successive workpieces, thereby producing finished internal surfaces of the same diameter. Such a two-point work support, for instance, lying on either side of a vertical line through the center of the workpiece in a machine in which the wheel is fed horizontally has the disadvantage that it does not provide adequate support in the area behind the point where the tool is applied to the work to support the workpiece during heavy roughing cuts. The workpiece cannot be urged against the two-point support with a heavy enough force to keep the piece from being displaced during heavy cuts. On the other hand, if support is provided directly behind the wheel without providing for errors in outside diameter, these errors are directly reflected in the final inside diameter in the refining operation.

It is the object of the present invention to overcome the above disadvantages and to provide a work support in a machine of the type described which adequately supports the work against the large forces exerted by the cutting tool, at least during the roughing operation and which during the finishing operation locates each of a succession of workpieces having slightly varying outer diameters so that the centers of the workpieces bear a precisely predetermined relation to the final position of the tool.

In the drawings, Fig. 1 shows one form of an adjustable type work support according to the invention in combination with a cutting tool and a workpiece of maximum outside diameter held in the work support.

Fig. 2 is a view similar to Fig. 1 showing a workpiece of minimum diameter held in the work support during a finish grinding operation.

Fig. 3 shows a first modification of the work support of the invention.

Fig. 4 shows a second modification of the work support.

Fig. 5 shows a third modification of the work support.

Fig. 6 shows a top plan view of a fourth modification.

Fig. 7 shows an end elevation of the fourth modification.

Fig. 8 shows a front view of the fourth modification.

In the drawings, Figs. 1 and 2 show a work support generally indicated at 30, a cutting tool or internal grinding wheel 26 and means such as a roll 34 for urging a workpiece against the work support during grinding and which may also serve as a driving wheel to rotate the workpiece. Means, which may be any conventional means such as the cross feed mechanism indicated at 90 in Fig. 8, are arranged to feed the tool 26 into the work in a horizontal direction or line of feed to the right as shown in Figs. 1 and 2. The work support 30 is adapted to receive workpieces W–1 and W–2 having peripheral surfaces P–1 and P–2 of slightly different outside diameters such as normally occur in a succession of workpieces of intended predetermined size. The workpiece W–1 has a peripheral surface P–1 of the largest diameter to be expected in a succession of workpieces W to be ground in a particular operation. The workpiece W–2 has a peripheral surface P–2, the diameter of which is smaller than that of P–1. The work support 30 is arranged to support the workpieces W–1 and W–2 so that their centers for practical purposes bear the same relationship to a final position of the cutting tool 26 in its horizontal movement to the right. For this purpose a first pair of support elements 36 and 38 are provided and arranged in spaced circumferential relation with respect to the workpieces W–1 and W–2 so as to provide supports which make contact with the peripheral surfaces P–1 and P–2 of the workpieces successively. The support elements 36 and 38 lie symmetrically on either side of a vertical line L which is at right angles to the line of feed F of the cutting tool 26 into the work W. The support elements 36 and 38 have concave surfaces which conform substantially to the shape of the peripheries P–1 and P–2 and which are therefore adapted to bridge small irregularities in the peripheral surfaces. The workpiece W–1 or W–2 is urged downwardly against the support elements 36 and 38 by the resilient roll 34 which is, in turn, urged downwardly against the workpiece and driven by conventional means not shown. By this arrangement of support elements 36 and 38, the centers of successive workpieces W–1 and W–2, when in contact with both support elements 36 and 38, will lie along the vertical line L. Although slight differences in diameters of successive outer peripheries P–1 and P–2 will cause successive workpiece centers to move slightly up or down, such variations are reflected in a vertical direction tangential to the face of the tool 26 and will not, for practical purposes, affect the position of the workpiece to the right or left with respect to a final position of the tool 26.

A third support element 40, also having a concave surface conforming to the outer periphery P–1 or P–2, is located substantially opposite the line of force F of the tool into the work W and preferably somewhat above the horizontal line through the center of the tool as shown, for a purpose to be described. The support element 40 may be locked in an adjustable left-right position with respect to the final position of the tool 26 by means of a screw 44 cooperating with which is a slot 42 to allow the support element 40 to slide with respect to it. A second locking screw 46 provides additional means to hold the support element 40 in its adjusted position. In adjusting the position of the third support element 40, it is moved so as to make contact with the outer periphery P-1 of the largest workpiece W-1 to be encountered in a succession of workpieces to be refined while the workpiece W-1 is seated against the first two support elements 36 and 38 as shown in Fig. 1. Thus, while a smaller workpiece W-2 is seated in the first two support elements 36 and 38, there is slight clearance, quite exaggerated, as shown in Fig. 2 between the outer periphery P-2 and the third support element 40.

In the operation of the machine which embodies the invention, the largest workpiece W-1 has constant support at three points furnished by the first two support elements 36 and 38 and the third support element 40, with the center of the workpiece lying along the line L. With its center thus fixed, it is adequately supported by the third support element 40 opposite the feed of the tool into the work while large forces are being exerted by the tool during a heavy roughing operation. When a smaller workpiece W-2 is being processed, the large force exerted by the tool 26 to the right during a roughing operation causes the workpiece W-2 to be unseated or displaced from the first support element 36 so that it moves to the right and is now supported at two points by the second support element 38 and third support element 40. This, of course, slightly displaces the center of the workpiece W-2 during the roughing operation, but such displacement is of no consequence until the finishing operation takes place. Meanwhile, the workpiece W-2 is adequately supported opposite the force exerted by the tool.

During such cutting operations, the large tangential force exerted by the wheel against the work tends to cause the workpiece to spin, that is, to rotate faster than the speed at which it is normally driven by the work rotating means, for instance, the roll 34. To prevent such spinning or overrunning, the major portion of the third support element 40 may be located as shown slightly above the line F to increase the forces between the workpiece W-1 and the support elements 38 and 40 when the workpiece is forced against the support element 40 in rough grinding. This increase comes about because the resultant force exerted by the wheel 26 on the workpiece W-1 when rough grinding, that is the resultant of force F and the downward tangential force exerted by the wheel, passes between the support elements 38 and 40. Because of this fact, the force of the wheel against the work produces between the work W-1 and the support elements 38 and 40 forces, the sum of which is greater than the resultant force of the wheel against the work. The further apart the support elements 38 and 40 are placed the greater will be the force of the work against them and the greater will be the consefrictional forces tending to prevent the work from spinning faster than it is driven by the friction of the driving roll 34. During the finishing operation which follows roughing, the tool 26 is applied with a much lighter force to the right against the workpiece and such force is insufficient to displace the workpiece W from its position against the first two support elements 36 and 38 against which it is held by the roll 34. A smaller workpiece W-2 is therefore held with its center on the line L during the finishing operation and the finished internal surface will therefore have the same diameter as that of a workpiece having a different outer diameter. During the finishing operation, the third support element 40 does not operate and is not needed for the workpiece because of the light force exerted against it by the tool 26. The three-point support therefore provides adequate support behind the tool when large forces are exerted against a workpiece during the roughing operation and at the same time locates successive workpieces so that they have the same relation to the tool during a finishing operation to produce uniform internal surfaces in spite of variations in outer diameter.

A modified form of the invention is shown in Fig. 3. It has a first pair of work support elements 36-a and 38-a arranged symmetrically on either side of the line L at right angles to the direction of force F of the wheel 26 against the workpiece W-1. It has a third support element in the form of a roll 40a whose axis 41 is fixed with relation to its distance from the line L and also from the final position of the tool 26 so that it makes contact with the outer periphery P-1 of the largest workpiece W-1 to be encountered in a succession of workpieces of particular size. Since this modification of the work support is not adjustable it accommodates workpieces of only one predetermined size having slightly varying outside diameters. The axis 41 of the third support element 40a is slightly above the line F of force of the wheel to provide a wedge between point of contact of the workpiece W-1 and the support element 40a and the support element 38a, as described above, to slow the rotation of the workpiece W-1 during the roughing cut.

A further modification of the work support of the invention is shown in Fig. 4 having the first pair of support elements 36b and 38b to which a third support element 40b is pivotally connected at its right end. All three support elements have concave surfaces to fit the outer periphery of the workpiece W-1. The left end of the support element 40b swings by gravity against the workpiece W-1 for a slightly smaller workpiece W-2. The support element 40b may be proportioned to resist the maximum force F to be expected, without lifting, thus providing an unyielding and rigid support substantially opposite the tool 26 and preventing the thin wall of the work from being distorted or vibrated by the force F of the wheel.

A further modification of the work support is shown in Fig. 5 in which the second and third support elements 38c and 40c are formed as continuations of an arcuate surface. The radius of the arcuate surface 43 from the center of the workpiece W-2 increases from 38c to 40c. During the roughing cut, the tool 26 pushes the workpiece W-2 away from the support elements 36c so that it is entirely supported on the arcuate surface 43 forming the second and third support elements 36c and 40c and supported opposite the tool 26 at 40c. During the finishing cut, when the wheel 26 exerts a lesser force, the workpiece is supported by the first and second elements 36c and 38c with its center along the line L.

The above embodiments of the invention thus provide support for the workpiece between a first and second point during one part of the grinding operation and between a second and third point during another part of the grinding operation.

A modification having an automatically adjustable work support is shown in Figs. 6-8. It comprises a work head assembly A for supporting and rotating a workpiece 1, and a wheel head assembly B which drives an internal grinding wheel 26 which is applied to finish the inner surface 53 of the workpiece 1. The work head assembly A is mounted on a table 11 which is arranged to slide to the left and right as viewed in Fig. 8 in the usual manner to present the workpiece 1 to the wheel 26 and, if desired, to reciprocate the wheel back and forth across the surface being ground. The wheel head B is arranged in the usual manner on a cross slide having suitable cross feed mechanism (indicated at 90 in Fig. 8) to feed the wheel against the work surface.

The workpiece being ground is seated in a support comprising two parts, a fixed part 4 having a pair of elements 4a and 4b supporting the workpiece by its outer peripheral surface against downward movement and a movable part 2 pivoted to the table 11 at 3 and arranged to support the workpiece 1 by its outer surface against the force exerted by the wheel 26 against the work which is to the right as viewed in Fig. 7. The effective surface of the movable part 2 extends above a horizontal line through the axis of rotation of the wheel 26 and may extend below this horizontal line, as shown, for grinding operations in which there is no danger of the work spinning faster than it is driven frictionally, as will be described, by the back plate 5. For heavy roughing operations, the effective surface of the movable part 2 preferably extends downwardly to a lesser extent, as has been described in connection with a corresponding support element 40 in Fig. 1. The support element 4b and the movable support part 2 thus provides, as was described in connection with Figs. 1 and 2, a wedge into which the resultant of the forces of the workpiece thereby increase the friction on it sufficiently to prevent over-running and the effectiveness of which depends upon the distance apart between the support part 2 and the support part 4b in straddling this wedging force. When the position of the movable part of the support 2 has been established as will be described, it is locked in position by locking mechanism comprising a fluid pressure operated piston 9 which clamps a reed or link 25 connected to the support element 2.

The workpiece 1 is driven by a revolving platen or back plate 5, best seen in Fig. 8 and which is hollow for a purpose to be described, against which it is thrust by pressure means comprising a pair of rolls 6 on a yoke 16 pivoted at 16a which are urged against the workpiece by a fluid pressure actuated piston 7 acting against the opposite end of the yoke 16 as best seen in Fig. 6.

The back plate 5 comprises one end of a sleeve 52 which rotates on an axis which is eccentric to the axis of the workpiece 1 and it is supported in bearings 50 in the work head A and it is driven by a pulley 51 on the opposite end of the sleeve 52. The back plate 5 being eccentric to the workpiece 1 urges the workpiece as it rotates downwardly against the fixed work support 4 where its position is established between the support elements 4a and 4b, there being a certain amount of sliding movement between the working face of the back plate 5 and the surface of the workpiece 1.

A work gage 10 is mounted within the back plate 5 and concentric to the workpiece 1 on a rod 10a which is slidable left and right as viewed in Fig. 8, in a sleeve 54. The work gauge is thus arranged so that it enters the workpiece when finished size is reached. The sleeve 54 is supported as a cantilever in a support 57.

Conventional mechanism not shown is connected to the gage so as to operate to enter the gage 10 in the work when the inner surface of the workpiece has been ground to the desired diameter and at the time to initiate and extend movement of the table 11 to the left to withdraw the wheel from the work.

A fluid pressure pump 100 supplies pressure through lines 102 and 103 to a valve mechanism 105 having a valve 13. The valve mechanism 105 is exhausted through lines 108 and 109.

When the table 11 moves to the left to separate the wheel from the work, a cam 12 on the bottom of the table commences to depress the valve element 13 exhausting the fluid behind the piston 9 through the lines 14 and 109 at the same time shutting off the pressure in the line 102. This unclamps the reed 25 and releases the support element 2 so that it is free to move to the left under the gentle pressure of the spring 24. Further movement of the table 11 to the left further depresses the valve element 13 shutting off pressure in the line 103 and exhausting the fluid from behind the piston 7 through the lines 15 and 108. This allows the yoke 16 to be swung counterclockwise as viewed in Fig. 6 by the spring 17 withdrawing the rolls 6 and 6' from the workpiece 1. At the same time, a hook 18 (Fig. 8) carried by the yoke 16 engages the workpiece 1 and pulls it off the support to the right as viewed in Fig. 8 allowing it to roll down an inclined surface 19 of the hook 18 and away from the machine. An escapement arm 20 (Figs. 6 and 7), carried by the yoke 16 which has been blocking the workpiece 1a, is moved out of the way to allow the new workpiece 1a to roll down the chute 21 onto an inclined surface 22 of the hook 18. Another escapement arm 32, carried by the yoke 16, is moved into position to block the workpiece 1b momentarily.

The table 11 is reversed in the usual way and as it moves toward the right, as viewed in Fig. 8, the cam 12 allows the valve member 13 to rise. The exhaust line 108 is closed and the pressure line 103 is opened to admit fluid pressure to the piston 7 through the line 15. The piston 7 causes the yoke 16 to swing back in a clockwise direction as viewed in Fig. 6 and the rolls 6 and 6' press the workpiece 1a which has now dropped off the hook 18 onto the support elements 4a and 4b against the back plate 5. The escapement arm 32 is thereby removed to unblock the workpiece 1b which rolls against the escapement arm 20 which has now come back into blocking position.

The back plate 5 rotates against the new workpiece 1a and, since it is displaced from the axis of the latter, thereby urges it by friction downwardly against the support elements 4a and 4b and turns it at the same time. The movable support element 2 having been unclamped is urged against the outside support surface of the workpiece 1a by the light spring 24 and is thereby located by the workpiece in a position which depends upon the outside diameter of the work.

As the table 11 continues to move to the right, the valve element 13 continues to rise to its uppermost position closing the exhaust line 109 and admitting pressure to the piston 9 from the pressure line 102 through the line 14. This clamps the reed 25 and locks the movable support element 2 in place. The wheel 26 is now fed against the work in the usual manner to the right as viewed in Fig. 2 to grind the work, and the movable support element 2 which has been fixed in position prevents the workpiece from being displaced or distorted by the tool 26.

This modification therefore provides a work support having two elements for supporting and indexing workpieces, and a third element which is automatically adjustable to fit the outside surface of each successive workpiece.

I claim:

1. In an internal grinding machine, a grinding tool applicable to an internal surface of a round workpiece, an external centerless support for said workpiece, said support comprising a first pair of separate surface portions arranged on a circumference in spaced angular relation and radially fixed with respect to the center of the circumference to make contact with an outer surface of said workpiece, means to move the grinding tool relative to said surface portions along a line of feed through said center, said surface portions straddling a line through said center normal to said line of feed, a third surface portion located substantially on said line of feed, means independent of the workpiece to hold said third surface portion in a fixed immovable position radially with respect to said center, said means positively restraining said third surface portion against the radial movement toward said center, said third surface portion being carried by said means, and means to urge said workpiece against said first pair of surface portions, the wall of said workpiece passing between the tool and said third surface portion and said third surface portion operating to abut the outer surface of the workpiece wall substantially opposite the point of contact between the tool and the inner surface of the workpiece wall and thereby, radially through said workpiece wall, to oppose the force of the tool against said inner surface and to prevent further radial movement of the workpiece when the tool forces the workpiece against said third surface portion.

2. In the combination as set forth in claim 1, the greater part of said third support element being arranged on the other side of the said line of feed with respect to the first two, thereby forming a throat into which said workpiece may fit with a wedging action between said third element and one of said first two elements, said third element and said one of said first two elements supporting said workpiece during heavy cuts by said tool and inhibiting excessive rotation of the workpiece.

3. In the combination as set forth in claim 1, said third surface portion being radially spaced from said center at a distance greater than the radial distance between said first pair of support elements and said center.

4. In an internal grinding machine, a grinding tool applicable to an internal surface of a round workpiece, an external centerless support for said workpiece, said support comprising a first pair of separate surface portions having concave arcuate support surfaces lying on a circumference and radially fixed with respect to the center of the circumference to make slidable contact with an outer surface of a said workpiece, means to move the grinding tool relative to said surface portions along a line of feed through said center, said surface portions straddling a line normal to said line of feed, a third surface portion located substantially on said line of feed, means independent of the workpiece to hold said third surface portion in a fixed immovable position radially with respect to said center, said means positively restraining said third surface portion against radial movement toward said center, said third surface portion being carried by said means, and means to urge said workpiece against said first pair of surface portions, the wall of said workpiece passing between the tool and the third surface portion, and said third surface portion operating to abut the outer surface of the workpiece wall substantially opposite the point of contact between the tool and the inner surface of the workpiece wall and thereby, radially through said workpiece wall, to oppose the force of the tool against said inner surface and to prevent further movement of the workpiece when the tool forces the workpiece against said third surface portion.

5. In an internal grinding machine, a grinding tool applicable to an internal surface of a round workpiece, an external centerless support for said workpiece, said support comprising a first pair of separate surface portions arranged on a circumference in spaced angular relation and radially fixed with respect to the center of the circumference to make contact with an outer surface of said workpiece, means to move the grinding tool relative to said surface portions along a line of feed through said center, said surface portions straddling a line through said center normal to said line of feed, a third surface portion located substantially on said line of feed, means independent of the workpiece to hold said third surface portion in a fixed immovable position radially with respect to said center, said means positively restraining said third surface portion against radial movement toward said center, said third surface portion being carried by said means, said means being adjustable to vary the radial distance between said third surface portion and said center and means to urge said workpiece against said first pair of surface portions, the wall of said workpiece passing between the tool and the said third surface portion and said third surface portion operating to abut the outer surface of the workpiece wall substantially opposite the point of contact between the tool and the inner surface of the workpiece wall and thereby, radially through said workpiece wall, to oppose the force of the tool against said inner surface and to prevent further radial movement of the workpiece when the tool forces the workpiece against said third surface portion.

6. In the combination as set forth in claim 1, said third surface portion being adjustably movable radially toward and away from said center to bring it into contact with the external surface of a said workpiece seated in said first pair of surface portions, and said means to hold said third surface portion including means to lock said element in an adjusted removable position radially with respect to said center and abutting the outer surface of the workpiece wall substantially opposite the point of contact between the tool and the inner surface of the workpiece wall and thereby radially through the workpiece wall to oppose immovably the force of the tool against said inner surface and to prevent radial movement of the workpiece when the tool forces the workpiece against said third surface portion.

7. In the combination as set forth in claim 6, said third surface portion and said first pair of surface portions being located on opposite sides of said line of feed of the tool into the workpiece thereby forming a throat providing a wedging action in opposition to the force of the tool against the work, said wedging action increasing the friction between the workpiece and the work support tending to prevent the workpiece from overspinning due to the rotation of the tool.

8. In an internal grinding machine, a grinding tool applicable to an internal surface of a round workpiece, an external centerless support for said workpiece, said support comprising a first pair of separate arcuate surface portions lying on a circumference in spaced angular relation and radially fixed with respect to the center of the circumference to make slidable contact with an outer surface of said workpiece, means to move the grinding tool relative to said surface portions along a line of feed through said center, said surface portions straddling a line through said center normal to said line of feed, a third surface portion located substantially on said line of feed, said third surface portion comprising an arcuate continuous extension of one of said first pair of surface portions, said extension lying on said circumference and being radially fixed with respect to said center, means independent of the workpiece to hold said third surface portion in a fixed immovable position radially with respect to said center, said means positively restraining said third surface against radial movement toward said center, said third surface portion being carried by said means, and means to urge said workpiece against said first pair of surface portions, the wall of said workpiece passing between the tool and said third surface portion, and said third surface portion operating to abut the outer surface of the workpiece wall substantially opposite the point of contact between the tool and the inner surface of the workpiece wall and thereby, radially through said workpiece wall, to oppose the force of the tool against said inner surface and to prevent further radial movement of the workpiece after the tool forces the workpiece against said third surface portion.

References Cited in the file of this patent

UNITED STATES PATENTS

| 2,290,269 | Blood et al. | July 21, 1942 |
| 2,329,191 | Favini | Sept. 14, 1943 |
| 2,478,607 | Theler et al. | Aug. 9, 1949 |
| 2,546,752 | Johnson | Mar. 27, 1951 |
| 2,635,395 | Arms et al. | Apr. 21, 1953 |
| 2,646,652 | Blood | July 28, 1953 |